(12) United States Patent
Iida et al.

(10) Patent No.: US 12,345,293 B2
(45) Date of Patent: Jul. 1, 2025

(54) THRUST FOIL BEARING

(71) Applicant: IHI Corporation, Tokyo (JP)

(72) Inventors: Tsutomu Iida, Tokyo (JP); Seiichiro Yoshinaga, Tokyo (JP); Masahiro Nakajima, Tokyo (JP); Shigekazu Aoyama, Tokyo (JP); Naomichi Omori, Tokyo (JP)

(73) Assignee: IHI Corporation, Tokyo (JP)

( * ) Notice: Subject to any disclaimer, the term of this patent is extended or adjusted under 35 U.S.C. 154(b) by 24 days.

(21) Appl. No.: 18/027,899

(22) PCT Filed: Sep. 22, 2021

(86) PCT No.: PCT/JP2021/034847
§ 371 (c)(1),
(2) Date: Mar. 22, 2023

(87) PCT Pub. No.: WO2022/065375
PCT Pub. Date: Mar. 31, 2022

(65) Prior Publication Data
US 2023/0366429 A1 Nov. 16, 2023

(30) Foreign Application Priority Data
Sep. 24, 2020 (JP) .................................. 2020-159534

(51) Int. Cl.
*F16C 17/04* (2006.01)
(52) U.S. Cl.
CPC .................................. *F16C 17/042* (2013.01)
(58) Field of Classification Search
CPC .................................................. F16C 17/042
See application file for complete search history.

(56) References Cited

U.S. PATENT DOCUMENTS

| 2015/0219147 | A1* | 8/2015 | Furuno | F16C 17/047 384/105 |
| 2016/0195129 | A1 | 7/2016 | Omori | |
| 2017/0298983 | A1* | 10/2017 | Omori | F16C 27/02 |

FOREIGN PATENT DOCUMENTS

| CN | 201373019 Y | * 12/2009 | ............ F16C 17/042 |
| CN | 103291745 A | 9/2013 | |
| CN | 105518323 A | 4/2016 | |
| CN | 107208694 A | 9/2017 | |
| EP | 2910802 A1 | 8/2015 | |
| EP | 3913243 A1 | 11/2021 | |

(Continued)

OTHER PUBLICATIONS

Machine Translation of CN-201373019 (Year: 2009).*
Machine Translation of JP 2017180592 (Year: 2017).*

*Primary Examiner* — Alan B Waits
(74) *Attorney, Agent, or Firm* — Rothwell, Figg, Ernst & Manbeck, P.C.

(57) ABSTRACT

A thrust foil bearing includes: a base plate including an insertion hole through which a shaft is inserted, and a supporting surface expanding in a direction orthogonal to an axial direction of the insertion hole; a step member placed on the supporting surface and formed of a different body from the base plate; and a back foil extending in a circumferential direction of the insertion hole and in which one part of the back foil is supported by the supporting surface and another part of the back foil next to the one part in the circumferential direction is supported by the step member.

6 Claims, 5 Drawing Sheets

(56) References Cited

FOREIGN PATENT DOCUMENTS

| | | |
|---|---|---|
| JP | S61-140217 U | 8/1986 |
| JP | H01-242816 A | 9/1989 |
| JP | 2003-232340 A | 8/2003 |
| JP | 2013-068285 A | 4/2013 |
| JP | 6065917 B2 | 1/2017 |
| JP | 2017-180592 A | 10/2017 |
| WO | 2014/061698 A1 | 4/2014 |
| WO | 2020/149200 A1 | 7/2020 |
| WO | WO-2023181577 A1 * | 9/2023 |

* cited by examiner

THRUST FOIL BEARING

CROSS REFERENCE TO RELATED APPLICATION

This application is a 35 U.S.C. 371 National Phase Entry Application from PCT/JP2021/034847, filed Sep. 22, 2021, which claims priority to Japanese Patent Application No. 2020-159534, filed on Sep. 24, 2020, all of which are incorporated by reference herein in their entireties.

BACKGROUND ART

In the related art, as a bearing for a high-speed rotating body, a thrust foil bearing that is disposed to face a thrust collar provided on a rotary shaft is known (refer to, for example, Patent Document 1 below). In the thrust foil bearing, the bearing surface thereof is formed of a flexible foil (thin metal plate) so as to be able to absorb the movement (shift in the axial direction and tilt of the thrust collar) of the rotary shaft caused by vibrations and impacts, and the thrust foil bearing has a foil structure under the bearing surface for flexibly supporting the bearing surface.

The thrust foil bearing has a form in which a plurality of top foil pieces and a plurality of back foil pieces are arranged in the circumferential direction. The top foil piece is supported by the back foil piece, and rotation of the thrust collar causes a lubricating fluid to be introduced into a space between the top foil piece and the thrust collar. This lubricating fluid forms a wedge-shaped fluid lubricating film between the top foil piece and the thrust collar, thereby making the load capacity of the thrust foil bearing.

DOCUMENT OF RELATED ART

Patent Document

[Patent Document 1] Japanese Patent No. 6065917

SUMMARY OF THE INVENTION

Problems to be Solved by the Invention

Incidentally, in the above related art, the back foil having a fixed height is disposed on an inclined surface formed on a base plate in order to form a wedge-shaped gap between the top foil and the thrust collar. Although such an inclined surface may be formed by cutting work or the like, it may be difficult to form a desired fluid lubricating film unless a certain degree of machining accuracy is ensured.

The present disclosure is made in view of the above circumstances, and an object thereof is to improve the load capacity of the thrust foil bearing.

Means for Solving the Problems

In order to solve the above problems, a thrust foil bearing of an aspect of the present disclosure includes: a base plate including an insertion hole through which a shaft is inserted, and a supporting surface expanding in a direction orthogonal to an axial direction of the insertion hole; a step member placed on the supporting surface and formed of a different body from the base plate; and a back foil extending in a circumferential direction of the insertion hole and in which one part of the back foil is supported by the supporting surface and another part of the back foil next to the one part in the circumferential direction is supported by the step member.

In the aspect of the present disclosure, the step member may be formed in a stair shape.

In the aspect of the present disclosure, the step member may be formed by a plurality of shims overlapping each other.

In the aspect of the present disclosure, the plurality of shims may include shims with different thicknesses.

In the aspect of the present disclosure, the plurality of shims may include shims with different shift amounts of end surfaces thereof.

In the aspect of the present disclosure, the plurality of shims may include a shim that does not directly support the back foil.

In the aspect of the present disclosure, an annular member may be attached to the base plate, and the step member may be sandwiched between the base plate and the annular member.

Effects of the Invention

According to the present disclosure, it is possible to improve the load capacity of a thrust foil bearing.

EMBODIMENTS FOR CARRYING OUT THE INVENTION

Hereinafter, thrust foil bearings of the present disclosure will be described with reference to the drawings.

Figure 1:
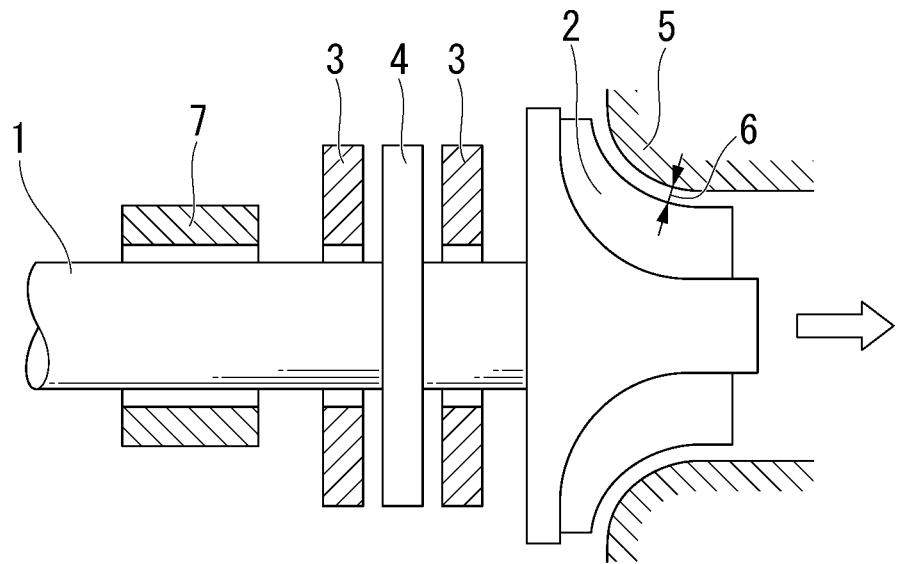
FIG. 1 is a side view showing an example of a turbo machine to which a thrust foil bearing of the present disclosure is applied.

FIG. 1 is a side view showing an example of a turbo machine to which a thrust foil bearing of the present disclosure is applied.

In FIG. 1, a reference sign 1 represents a rotary shaft (shaft), a reference sign 2 represents an impeller provided on an end part of the rotary shaft, and a reference sign 3 represents a thrust foil bearing related to the present disclosure.

A disc-shaped thrust collar 4 is attached to the rotary shaft 1. The thrust collar 4 is interposed between a pair of thrust foil bearings 3. The impeller 2 is disposed inside a housing 5 that is on the stationary side and has a tip clearance 6 between itself and the housing 5. The rotary shaft 1 is supported by a radial foil bearing 7.

Figure 2:
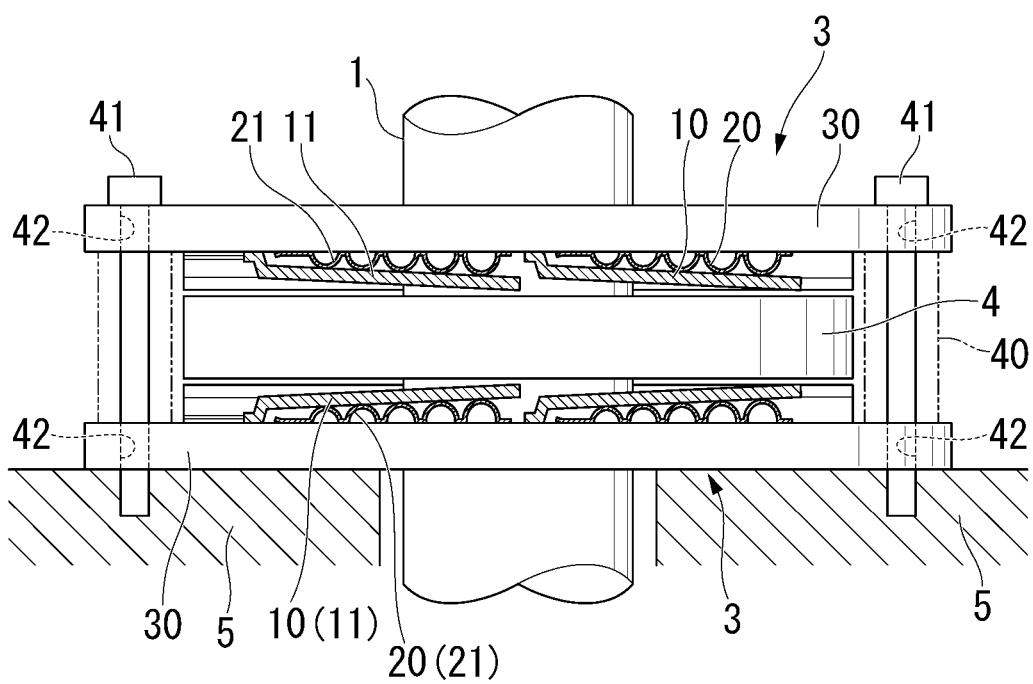
FIG. 2 is a side view showing the thrust foil bearing of the present disclosure.

FIG. 2 is a side view showing the thrust foil bearings 3 of the present disclosure.

As shown in FIG. 2, the two thrust foil bearings 3 are provided on two sides of the thrust collar 4 such that the thrust collar 4 is interposed therebetween. The two thrust foil bearings 3 have an equal configuration. The thrust foil bearing 3 includes a top foil 10, a back foil 20, and a base plate 30.

A cylindrical bearing spacer 40 (annular member) shown by dashed double-dotted lines in FIG. 2 is sandwiched between the base plates 30 of the pair of thrust foil bearings 3. These base plates 30 are connected together through the bearing spacer 40 by fastening bolts 41. The outer peripheral portion of the base plate 30 is provided with through-holes 42 for inserting the fastening bolts 41 therethrough. One of the base plates 30 connected together in this way is in contact with the housing 5 by fastening using the fastening bolts 41.

A portion of the housing 5 with which the thrust foil bearing 3 is in contact is omitted in FIG. 1.

First Embodiment

Figure 3:
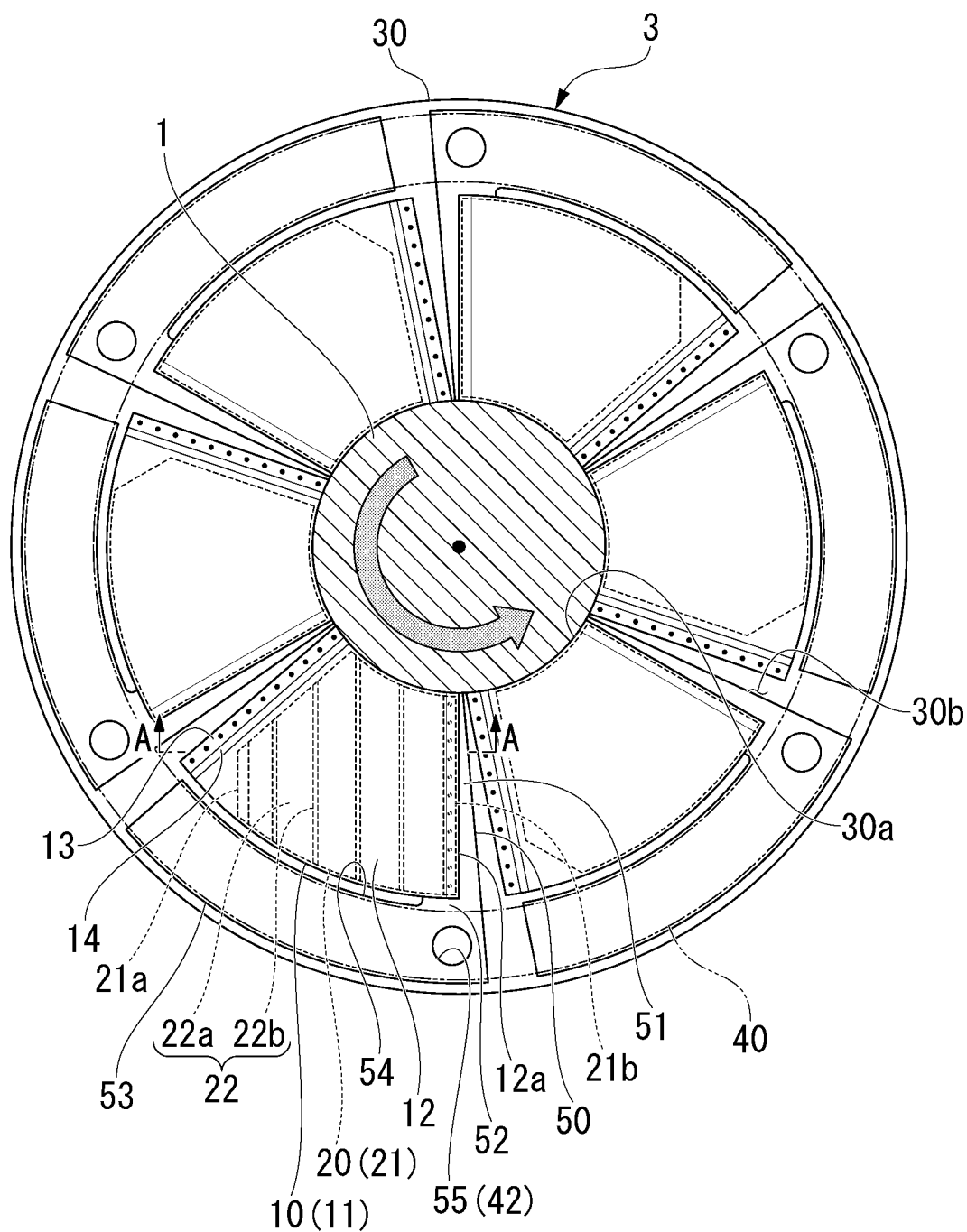
FIG. 3 is a plan view showing a thrust foil bearing related to a first embodiment of the present disclosure.
Figure 4:
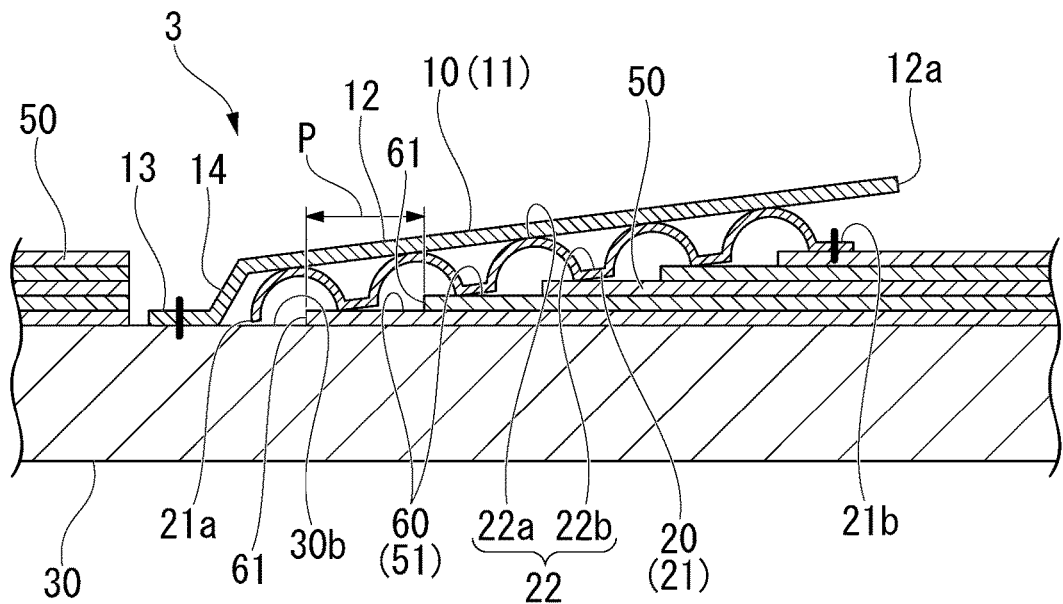
FIG. 4 is a cross-sectional view taken along line A-A and viewed in arrow direction shown in FIG. 3.

FIG. 3 is a plan view showing the thrust foil bearing 3 related to a first embodiment of the present disclosure. FIG. 4 is a cross-sectional view taken along line A-A and viewed in arrow direction shown in FIG. 3.

As shown in FIG. 3, the base plate 30 includes an insertion hole 30a through which the rotary shaft 1 is inserted.

In the following description, the positional relationships of members may be described based on the insertion hole 30a. Specifically, the "axial direction" refers to a direction in which the insertion hole 30a extends (a direction in which the rotary shaft 1 is inserted, a direction in which the rotary shaft 1 extends). The "radial direction" refers to the radial direction of the insertion hole 30a. The "circumferential direction" refers to a circumferential direction along the inner peripheral surface of the insertion hole 30a. Alternatively, they may also be referred to as a "radial direction" and a "circumferential direction" based on the axis of the rotary shaft 1 inserted through the insertion hole 30a and viewed from the axis.

The "radial direction" may also refer to a direction intersecting with the central axis line of the insertion hole 30a when viewed in the direction of the central axis line. The "circumferential direction" may also refer to a direction around the central axis line of the insertion hole 30a.

The base plate 30 constitutes the outermost part (the farthest side from the thrust collar) of the thrust foil bearing 3 in the axial direction. The base plate 30 is provided with the insertion hole 30a. That is, the base plate 30 of the present disclosure is a disk-shaped member provided with the insertion hole 30a. However, as long as the base plate 30 includes the insertion hole 30a, the base plate 30 may be a member having a shape (for example, rectangular plate shape) other than a disc shape. It is not necessary for the insertion hole 30a to have a strictly cylindrical shape.

The base plate 30 is formed of, for example, a metal plate having a thickness of several millimeters. The base plate 30 includes a supporting surface 30b (flat surface) expanding in a direction orthogonal to the axial direction of the insertion hole 30a. The supporting surface 30b is disposed to face the thrust collar 4. The top foil 10, the back foil 20, and a step member 50 described below are arranged around the insertion hole 30a (opening) in the supporting surface 30b. Specifically, the top foil 10 is supported by the back foil 20, and the back foil 20 is supported by the base plate 30 and the step member 50. That is, the top foil 10 is also supported by the base plate 30 and the step member 50 through the back foil 20.

In the present disclosure, the top foil 10 and the back foil 20 are formed of a plurality (six) of top foil pieces 11 and a plurality (six) of back foil pieces 21, respectively. The base plate 30 supports the six top foil pieces 11 and the six back foil pieces 21 at regular intervals in the circumferential direction of the supporting surface 30b. The numbers of the top foil pieces 11 and the back foil pieces 21 are not limited to six and may be two to five or seven or more.

The top foil 10 of the present disclosure is formed of six thin metal plates (the top foil pieces 11) arranged in the circumferential direction. The top foil piece 11 includes an inclined portion 12 and an attachment portion 13, the inclined portion 12 is inclined upward (toward a viewer viewing FIG. 3, or in a direction from the base plate 30 toward the top foil piece 11 in the axial direction) from one side (upstream side in the rotation direction of the rotary shaft 1) toward another side (downstream side in the rotation direction of the rotary shaft 1) in the circumferential direction, and the attachment portion 13 is joined to the one side in the circumferential direction of the inclined portion 12 and is attached to the base plate 30.

As shown in FIG. 3, the inclined portion 12 is formed in an approximately trapezoidal shape in which the radially inner side and the radially outer side thereof are made arc-shaped by cutting out, from a sector shape, the apex side thereof. That is, the inclined portion 12 includes two edges separated from each other in the circumferential direction and extending from the radially inner side to the radially outer side, a radially inner-side edge connecting the two edges to each other on the radially inner side, and a radially outer-side edge connecting the two edges to each other on the radially outer side. The edge (hereinafter referred to as an end part 12a on the other side in the circumferential direction) of the inclined portion 12 on the other side in the circumferential direction extending from the radially inner side to the radially outer side is made to be a free end.

On the other hand, the edge of the inclined portion 12 on the one side in the circumferential direction extending from the radially inner side to the radially outer side is connected to the attachment portion 13 through a bent portion 14. As shown in FIG. 4, the bent portion 14 is configured of a first bend and a second bend positioned on the other side in the circumferential direction of the first bend. The first bend bends toward the back side of a surface of the top foil piece 11 facing the base plate 30. The second bend bends toward the surface of the top foil piece 11 facing the base plate 30. That is, the bent portion 14 has a stair shape. Both of the first bend and the second bend have obtuse angles.

In other words, the first bend bends to be convex toward the base plate 30, and the second bend bends to be convex toward the opposite side from the base plate 30 (toward the thrust collar 4).

The inclined portion 12 positioned to be closer to the other side in the circumferential direction than the bent portion 14 is supported by a supporting portion 22 of the back foil piece 21. The inclined portion 12 supported by the supporting portion 22 is disposed to be inclined at an initial inclination angle so as to gradually separate from the base plate 30 from the one side to the other side in the circumferential direction. The initial inclination angle means the inclination angle of the top foil piece 11 (that is, the inclined portion 12) with respect to the base plate 30 when the load is zero. The base plate 30 of the present disclosure includes the supporting surface 30b expanding in a direction orthogonal to the axial direction, and the inclined portion 12 is inclined with respect to the supporting surface 30b.

The attachment portion 13 is connected to the one side (first bend-side) in the circumferential direction of the bent portion 14. In the present disclosure, the attachment portion 13 is formed in a strip shape having the same length as that of the bent portion 14 in the radial direction and is spot-welded to the base plate 30. That is, this welding position is the attachment position of the top foil piece 11 to the base plate 30. The attachment of the top foil piece 11 to the base plate 30 can also be performed by, for example, screwing instead of spot-welding. The attachment portion 13 and the bent portion 14 do not have to have an equal length in the radial direction.

On the other hand, the back foil 20 is formed of six thin metal plates (the back foil pieces 21) arranged in the circumferential direction. The back foil piece 21 includes the supporting portion 22 supporting the inclined portion 12 of the top foil piece 11. As shown in FIG. 4, the supporting portion 22 is a wave-shaped foil (bump foil) in which mountain parts 22a and valley parts 22b are alternately formed. The supporting portion 22 elastically supports the inclined portion 12 of the top foil piece 11.

For the supporting portion 22, for example, a bump foil, a spring foil shown in Japanese Unexamined Patent Application, First Publication No. 2006-57652 or Japanese Unexamined Patent Application, First Publication No. 2004-270904, a back foil shown in Japanese Unexamined Patent Application, First Publication No. 2009-299748, or the like can be used. Although the spring foils shown in Japanese Unexamined Patent Application, First Publication No. 2006-57652 and Japanese Unexamined Patent Application, First Publication No. 2004-270904, and the back foil shown in Japanese Unexamined Patent Application, First Publication No. 2009-299748 are foils used for radial bearings, when the foils are opened to be flat and are formed in an annular shape, they can be foils (the supporting portion 22) used for the thrust foil bearing 3.

The supporting portion 22 of the present disclosure is formed of a bump foil. The supporting portion 22 is formed to be slightly smaller than the inclined portion 12 of the top foil piece 11 in plan view shown in FIG. 3. Therefore, the supporting portion 22 is covered by the inclined portion 12. The supporting portion 22 is formed, similarly to the inclined portion 12, in an approximately trapezoidal shape in which the radially inner side and the radially outer side thereof are made arc-shaped by cutting out, from a sector shape, the apex side thereof. That is, the supporting portion 22 includes two edges separated from each other in the circumferential direction and extending from the radially inner side to the radially outer side, a radially inner-side edge connecting the two edges to each other on the radially inner side, and a radially outer-side edge connecting the two edges to each other on the radially outer side.

The edge (hereinafter referred to as an end part on the one side in the circumferential direction) of the supporting portion 22 on the one side in the circumferential direction extending from the radially inner side to the radially outer side is provided with a parallel part (hereinafter referred to as a back foil end 21a) extending to be parallel to the edge (hereinafter referred to as an end part on the other side in the circumferential direction) of the supporting portion 22 on the other side in the circumferential direction extending from the radially inner side to the radially outer side. In the supporting portion 22, the valley parts 22b and the mountain parts 22a are alternately joined together in a first direction from the back foil end 21a toward the end part of the supporting portion 22 on the other side in the circumferential direction, that is, in a normal direction (also referred to as a direction orthogonal to the ridge lines of the mountain parts 22a) orthogonal to the back foil end 21a and the end part of the supporting portion 22 on the other side in the circumferential direction.

As shown in FIG. 4, the valley part 22b includes a flat surface and faces the base plate 30 and the step member 50. The mountain part 22a is made to be an arch-shaped part connecting adjacent valley parts 22b to each other. The back foil piece 21 is supported by the base plate 30 and the step member 50. Therefore, the valley parts 22b can come into contact with the base plate 30 and the step member 50. Two end parts of the supporting portion 22, that is, the back foil end 21a and the end part (hereinafter referred to as an attachment portion 21b) of the supporting portion 22 on the other side in the circumferential direction, are formed of the valley parts 22b.

In the present disclosure, the valley parts 22b are formed with approximately equal pitches, and the mountain parts 22a are formed with approximately equal pitches. The heights of the mountain parts 22a are formed to be a fixed height. The attachment portion 21b is spot-welded to the step member 50. That is, this welding position is the attachment position of the back foil piece 21 in the circumferential direction. That is, in the present disclosure, the attachment position of the back foil piece 21 is in the valley part 22b (the attachment portion 21b) positioned at the end on the other side (right side in FIG. 4) in the first direction.

The valley part 22b (the back foil end 21a) positioned at an end of the back foil piece 21 on the one side (left side in FIG. 4) in the first direction is made to be a free end. That is, when a load acts on the back foil piece 21, the back foil end 21a can move toward the one side in the first direction. The attachment of the back foil piece 21 to the step member 50 can also be performed by, for example, screwing instead of spot-welding.

The step member 50 is formed of a different body from the base plate 30 and is placed on the supporting surface 30b. As shown in FIG. 3, the step member 50 includes a step support portion 51 supporting the back foil piece 21 (the back foil 20) from an intermediate position in the circumferential direction, an extending portion 52 joined to the other side in the circumferential direction of the step support portion 51 and extending outward in the radial direction, and a sandwiched portion 53 joined to the extending portion 52 on an outer side than the step support portion 51 in the radial direction and extending toward the one side in the circumferential direction.

The extending portion 52 is connected to the outer side in the radial direction of the other side in the circumferential direction of the step support portion 51. The extending portion 52 is formed in a strip shape extending outward in the radial direction and is connected to the sandwiched portion 53.

The sandwiched portion 53 is formed in an approximately trapezoidal shape in which the radially inner side and the radially outer side thereof are made arc-shaped by cutting out, from a sector shape, the apex side thereof. That is, the sandwiched portion 53 includes two edges separated from each other in the circumferential direction and extending from the radially inner side to the radially outer side, a radially inner-side edge connecting the two edges to each other on the radially inner side, and a radially outer-side edge connecting the two edges to each other on the radially outer side.

A slit 54 is formed between the sandwiched portion 53 and the step support portion 51. The slit 54 divides the step member 50 into an inner area and an outer area in the radial direction. The slit 54 extends in the circumferential direction from an edge on the one side toward another edge on the other side in the circumferential direction of the step member 50. As shown in FIG. 3, the outer area than the slit 54 extends to a position in the radial direction in which the bearing spacer 40 is disposed. That is, the sandwiched portion 53 is sandwiched between the base plate 30 and the bearing spacer in the axial direction.

The sandwiched portion 53 is provided with a through-hole 55 through which the fastening bolt 41 that attaches the bearing spacer 40 to the base plate 30 is inserted. The through-hole 55 of the sandwiched portion 53 overlaps the through-hole 42 of the base plate 30 in the axial direction. The through-hole 55 of the sandwiched portion 53 is disposed in the vicinity of the connecting position to the extending portion 52. As shown in FIG. 3, the length of the sandwiched portion 53 in the radial direction may be equivalent to the length in the radial direction from the inner peripheral surface to the outer peripheral surface of the bearing spacer 40. The sandwiched portion 53 may have a length in the circumferential direction corresponding to about 60° (about ⅙ of the entire circumference) of the 360° circumference of the bearing spacer 40. Thereby, the six step members 50 (the sandwiched portions 53) are sandwiched on approximately the entire circumference of the bearing spacer 40.

As shown in FIG. 4, the step member 50 is formed by a plurality of shims 60 (thin metal plates) overlapping each other. The plurality of shims 60 are each formed in a plate shape having a fixed thickness. The plurality of shims 60 overlap each other in the step support portion 51 such that end surfaces 61 thereof on the one side in the circumferential direction further shift to the other side in the circumferential direction as the number of stages increases. That is, the end surface 61 of the shim 60 on the second stage shifts by a certain distance to the other side in the circumferential direction from the end surface 61 of the shim 60 on the first stage. The same goes for the end surface 61 of the shim 60 on each of the third and subsequent stages. In the plurality of shims 60, the end surfaces of the portions (in each of the extending portion 52 and the sandwiched portion 53 described above) other than the step support portion 51 are aligned.

That is, in the plurality of shims 60, the positions in a direction along the supporting surface 30*b* of the end surfaces of the portions (in each of the extending portion 52 and the sandwiched portion 53 described above) other than the step support portion 51 are the same as each other.

The shift amounts P between the end surfaces 61 of the overlapping shims 60 (for example, the shim 60 on the first stage and the shim 60 on the second stage) are a fixed amount. The shift amounts P are the same as the pitches of the mountain parts 22*a* and the pitches of the valley parts 22*b* of the back foil piece 21. The number of the shims 60 is equal to the number of the mountain parts 22*a*. The number of the shims 60 is one less than the number of the valley parts 22*b*. The plurality of shims 60 (the step support portion 51) support the valley parts 22*b* other than the valley part 22*b* positioned to be closest to the one side in the circumferential direction. That is, the valley part 22*b* (one part) positioned to be closest to the one side in the circumferential direction is supported by the supporting surface 30*b* of the base plate 30, and the other valley parts 22*b* (the remainder) are supported by the stages of the step support portion 51 one by one.

Next, the operation of the thrust foil bearing 3 having the above configuration will be described.

As shown in FIG. 2, the thrust foil bearings 3 are provided on both sides of the thrust collar 4 so that the thrust collar 4 is interposed therebetween. Therefore, the movement of the rotary shaft 1 in two different directions parallel to the thrust direction thereof can be limited.

In such a state, when the rotary shaft 1 rotates so that the thrust collar 4 starts rotating, while the thrust collar 4 and the top foil piece 11 rub against each other, an ambient fluid is pushed into a wedge-shaped space formed therebetween. Then, when the rotational speed of the thrust collar 4 reaches a certain speed, a fluid lubrication film is formed therebetween. The pressure of the fluid lubrication film pushes the top foil piece 11 toward the back foil piece 21, and the thrust collar 4 breaks away from the contact state with the top foil piece 11 and starts rotating in non-contact.

As shown in FIG. 4, one part of the back foil piece 21 is supported by the supporting surface 30*b*, and the remainder thereof is supported by the step member 50 from an intermediate position in the circumferential direction. The supporting surface 30*b* is a flat surface expanding in a direction orthogonal to the axial direction of the insertion hole 30*a*. The step member 50 is placed on the supporting surface 30*b* and is formed in a stair shape whose height increases toward the other side in the circumferential direction. That is, the step member 50 of this embodiment is provided with a plurality of surfaces that are approximately parallel to the supporting surface 30*b* and have different heights. Since the step member 50 is a different body from the base plate 30, machining can be high accurately performed thereon, and a pseudo-inclined surface with high accuracy can be formed on the supporting surface 30*b*. Thereby, an appropriate inclination can be provided in the back foil piece 21, and a proper fluid lubricating film can be formed between the thrust collar 4 and the top foil piece 11.

Therefore, according to the first embodiment described above, a configuration is adopted, which includes the base plate 30 including the insertion hole 30*a* through which the rotary shaft 1 is inserted and the supporting surface 30*b* expanding in a direction orthogonal to the axial direction of the insertion hole, the step member 50 placed on the supporting surface 30*b* and formed of a different body from the base plate 30, and the back foil 20 extending in the circumferential direction of the insertion hole 30*a* and in which one part of the back foil 20 is supported by the supporting surface 30*b* and the remainder of the back foil 20 is supported by the step member 50 from an intermediate position in the circumferential direction, whereby it is possible to improve the load capacity of the thrust foil bearing 3.

In other words, as shown in FIG. 4, in the back foil piece 21, one part thereof is supported by the supporting surface 30*b*, and another part thereof next to the one part in the circumferential direction is supported by the step member 50. The back foil piece 21 may include a portion that is not supported by the supporting surface 30*b* or the step member 50.

In the first embodiment, since the step member 50 is formed in a stair shape, it is possible to form a pseudo-inclined surface with a simple shape and high accuracy.

In the first embodiment, the step member 50 is formed by the plurality of shims 60 overlapping each other. The shim 60 can be high accurately mass-manufactured through etching, precision press working or the like.

In the first embodiment, as shown in FIG. 3, the bearing spacer 40 is attached to the base plate 30, and the step member 50 is sandwiched between the base plate 30 and the bearing spacer 40. Thereby, the step member 50 can be sandwiched by using the bearing spacer 40 that secures a space between the base plates 30 of the pair of thrust foil bearings 3. The step member 50 is sandwiched, whereby the step member 50 is limited from moving from its predetermined position.

Second Embodiment

Next, a second embodiment of the present disclosure will be described. In the following description, the same or equivalent components as or to those of the above-described embodiment will be represented by equal reference signs, and the descriptions thereof will be simplified or omitted.

Figure 5:
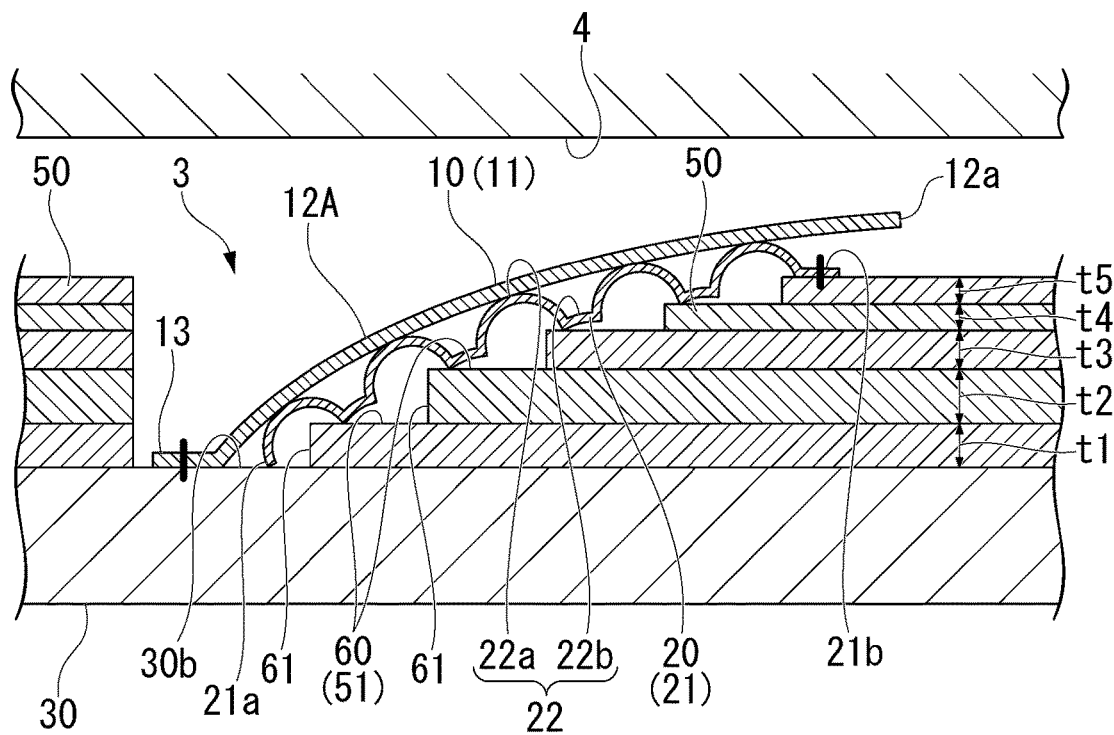
FIG. 5 is a cross-sectional view showing an essential part of a thrust foil bearing related to a second embodiment of the present disclosure.

FIG. 5 is a cross-sectional view showing an essential part of a thrust foil bearing 3 related to the second embodiment of the present disclosure. FIG. 5 corresponds to a cross-sectional view taken along line A-A and viewed in arrow direction shown in FIG. 3.

As shown in FIG. 5, the second embodiment differs from the above embodiment in that a step member 50 (a plurality of shims 60) includes shims 60 with different thicknesses.

Specifically, the shim 60 on the first stage is formed with a thickness t1. The shim 60 on the second stage is formed with a thickness t2 that is greater than the thickness t1. The shim 60 on the third stage is formed with a thickness t3 that is less than the thickness t2. The shim 60 on the fourth stage is formed with a thickness t4 that is less than the thickness t3. The shim 60 on the fifth stage is formed with a thickness t5 that is slightly less than the thickness t4.

That is, the shim 60 on the second stage is the thickest, and the thicknesses of the shims 60 decrease away from the shim 60 on the second stage toward each of one side (upper side in FIG. 5, the thrust collar 4-side) and another side (lower side in FIG. 5, the base plate 30-side) in the axial direction. The back foil piece 21 is supported by the plurality of shims 60 (a step support portion 51) having such thicknesses. The top foil piece 11 supported by the back foil piece 21 includes an inclined portion 12A that curves to be convex toward the one side in the axial direction. The inclined portion 12A curves such that the inclination thereof with respect to the supporting surface 30b (in other words, the thrust collar 4) gradually decreases toward the other side in the circumferential direction.

Figure 6:
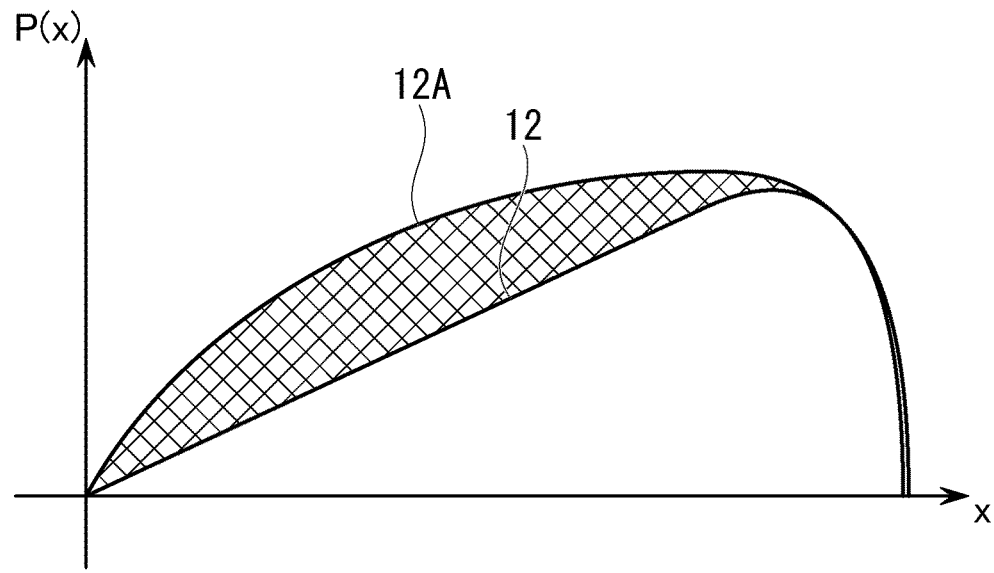
FIG. 6 is an explanatory diagram showing the load capacity of the thrust foil bearing related to the second embodiment of the present disclosure.

FIG. 6 is an explanatory diagram showing the load capacity of the thrust foil bearing 3 related to the second embodiment of the present disclosure. In the graph shown in FIG. 6, a horizontal axis x refers to the position in the circumferential direction, and a vertical axis P(x) refers to the pressure of the fluid lubrication film, that is, the load capacity of the thrust foil bearing 3.

As shown in FIG. 6, in the second embodiment, the top foil piece 11 includes the inclined portion 12A with a curved surface, so the pressure of the fluid lubrication film increases by the value corresponding to the meshed area when compared with the inclined portion 12 with the inclined surface (surface having a fixed inclination angle) of the first embodiment.

That is, according to the second embodiment, as shown in FIG. 5, the load capacity of the thrust foil bearing 3 can be improved by making the thicknesses of the plurality of shims 60 different.

Third Embodiment

Next, a third embodiment of the present disclosure will be described. In the following description, the same or equivalent components as or to those of the above-described embodiments will be represented by equal reference signs, and the descriptions thereof will be simplified or omitted.

Figure 7:
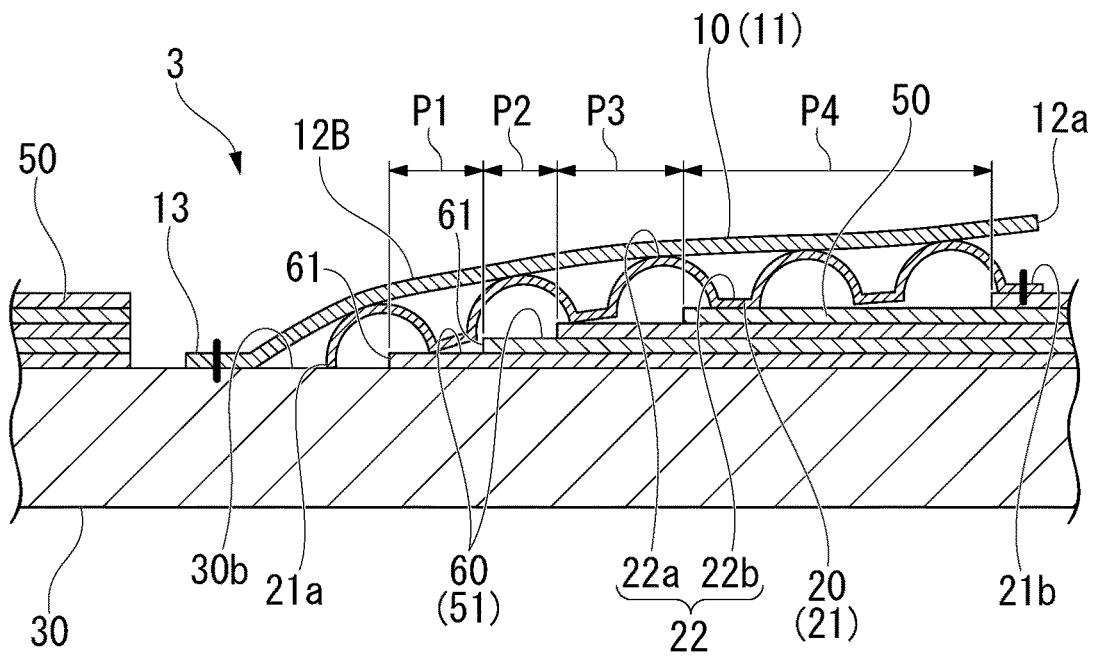
FIG. 7 is a cross-sectional view showing an essential part of a thrust foil bearing related to a third embodiment of the present disclosure.

FIG. 7 is a cross-sectional view showing an essential part of a thrust foil bearing 3 related to the third embodiment of the present disclosure. FIG. 7 corresponds to a cross-sectional view taken along line A-A and viewed in arrow direction shown in FIG. 3.

As shown in FIG. 7, the third embodiment differs from the above embodiments in that a step member 50 (a plurality of shims 60) includes shims 60 with different shift amounts of end surfaces 61. The thicknesses of the plurality of shims 60 are a fixed value, but the thicknesses may be different.

Specifically, the shim 60 on the second stage overlaps the shim 60 on the first stage such that the end surface 61 shifts by a shift amount P1 therefrom. The shim 60 on the third stage overlaps the shim 60 on the second stage such that the end surface 61 shifts therefrom by a shift amount P2 that is less than the shift amount P1. The shim 60 on the fourth stage overlaps the shim 60 on the third stage such that the end surface 61 shifts therefrom by a shift amount P3 that is greater than the shift amount P2. The shim 60 on the fifth stage overlaps the shim 60 on the fourth stage such that the end surface 61 shifts therefrom by a shift amount P4 that is greater than the shift amount P3.

That is, the shift amount P2 of the shim 60 on the third stage is the smallest (the supporting area of the shim 60 on the second stage is the smallest), and the supporting areas of the shims 60 increase away from the shim 60 on the second stage toward each of one side (upper side in FIG. 5) and another side (lower side in FIG. 5) in the axial direction. The back foil piece 21 is supported by the plurality of shims 60 (a step support portion 51) having the above configuration. The top foil piece 11 supported by the back foil piece 21 forms an inclined portion 12B that curves to be convex toward the one side in the axial direction. Thereby, the load capacity of the thrust foil bearing 3 can be improved similarly to the second embodiment.

The above supporting area refers to the area of a region of each shim 60 exposed toward the back foil 20.

In the third embodiment, the shim 60 on the second stage does not directly support the valley part 22b of the back foil piece 21, and the shim 60 on the fourth stage supports two valley parts 22b. Thereby, the shape of the inclined portion 12B of the top foil piece 11 is not formed to have only a simple curved surface represented by a quadratic function but can also be formed to have a curved surface represented by a cubic function. In the example shown in FIG. 7, the other side in the circumferential direction of the inclined portion 12B curves so as to warp toward the one side in the axial direction. Thereby, the load capacity of the top foil piece 11 on the other side in the circumferential direction can be improved.

That is, part of the inclined portion 12B on the one side in the circumferential direction curves so as to be convex toward the one side in the axial direction, and part of the inclined portion 12B on the other side in the circumferential direction curves so as to be convex toward the other side in the axial direction, so in FIG. 7, the inclined portion 12B curves in an inverted S shape.

The shim 60 on the second stage is not in contact with the valley part 22b of the back foil piece 21.

Hereinbefore, the appropriate embodiments of the present disclosure have been described with reference to the drawings, but the present disclosure is not limited to the above embodiments. The various shapes, combinations and the like of the components shown in the above-described embodiments are examples, and various modifications can be adopted based on design requirements and the like within the scope of the present disclosure.

Figure 8:
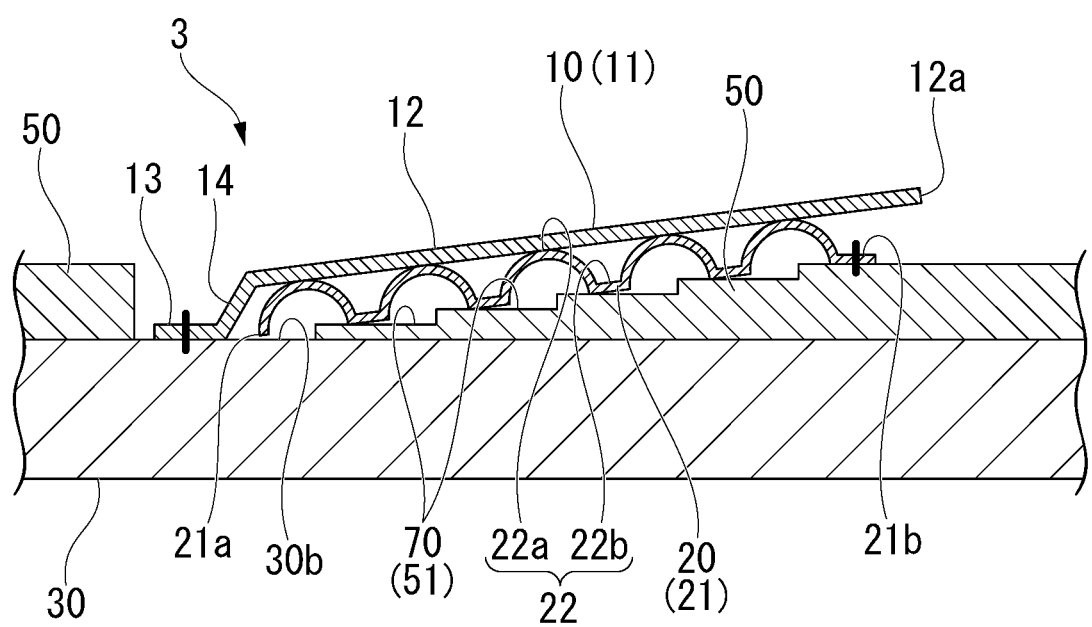
FIG. 8 is a cross-sectional view showing an essential part of a thrust foil bearing related to a modification of the present disclosure.

For example, as in a modification shown in FIG. 8, the step member 50 may not be formed of the plurality of shims 60. The step member 50 of this modification includes a plurality of steps 70 that are integrally formed through etching, precision press working or the like, and the plurality of steps 70 form a step support portion 51.

For example, in the above embodiments, the step member 50 is sandwiched between the base plate 30 and the bearing spacer 40, but the step member 50 may be fixed to the base plate 30 by welding, bolt fastening or the like.

INDUSTRIAL APPLICABILITY

The present disclosure is applicable to a thrust foil bearing including a base plate and a back foil supported by the base plate, and an object thereof is to improve the load capacity of the thrust foil bearing. from the specification as follows:

The invention claimed is:

1. A thrust foil bearing comprising:
a base plate including an insertion hole through which a shaft is inserted, and a supporting surface expanding in a direction orthogonal to an axial direction of the insertion hole;
a step member placed on the supporting surface and formed of a different body from the base plate; and
a back foil extending in a circumferential direction of the insertion hole and in which one part of the back foil is supported by the supporting surface and another part of the back foil next to the one part in the circumferential direction is supported by the step member, wherein
the back foil includes a plurality of mountain parts and a plurality of valley parts that are alternately formed,
the step member includes first surfaces having different heights in the axial direction, and a second surface connecting the first surfaces next to each other, and
at least two valley parts of the plurality of valley parts are supported by the first surfaces.

2. The thrust foil bearing according to claim 1, wherein the step member is formed by a plurality of shims overlapping each other.

3. The thrust foil bearing according to claim 2, wherein the plurality of shims include shims with different thicknesses.

4. The thrust foil bearing according to claim 2, wherein the plurality of shims include shims with different shift amounts of end surfaces thereof.

5. The thrust foil bearing according to claim 2, wherein the plurality of shims include a shim that does not directly support the back foil.

6. A thrust foil bearing comprising:
a base plate including an insertion hole through which a shaft is inserted, and a supporting surface expanding in a direction orthogonal to an axial direction of the insertion hole;
a step member placed on the supporting surface and formed of a different body from the base plate; and
a back foil extending in a circumferential direction of the insertion hole and in which one part of the back foil is supported by the supporting surface and another part of the back foil next to the one part in the circumferential direction is supported by the step member,
wherein an annular member is attached to the base plate, and the step member is sandwiched between the base plate and the annular member.

* * * * *